(12) United States Patent
Gilek et al.

(10) Patent No.: US 7,624,430 B2
(45) Date of Patent: Nov. 24, 2009

(54) METHOD FOR ACCESSING A DATA PROCESSING SYSTEM

(75) Inventors: Carlos Henrique Arglebe Gilek, Nürnberg (DE); Gerd Schmidt, Nürnberg (DE)

(73) Assignee: Siemens Aktiengesellschaft (DE)

( * ) Notice: Subject to any disclaimer, the term of this patent is extended or adjusted under 35 U.S.C. 154(b) by 446 days.

(21) Appl. No.: 10/579,685

(22) PCT Filed: Nov. 9, 2004

(86) PCT No.: PCT/EP2004/052890

§ 371 (c)(1),
(2), (4) Date: May 17, 2006

(87) PCT Pub. No.: WO2005/050418

PCT Pub. Date: Jun. 2, 2005

(65) Prior Publication Data

US 2007/0150940 A1 Jun. 28, 2007

(30) Foreign Application Priority Data

Nov. 19, 2003 (DE) ................. 103 53 966

(51) Int. Cl.
*G06F 7/04* (2006.01)
*H04L 9/00* (2006.01)

(52) U.S. Cl. .................. 726/4; 726/5; 726/6; 726/7; 726/8; 726/9; 713/182; 713/183; 713/184; 713/185; 713/186; 380/227; 380/228

(58) Field of Classification Search .............. 726/4
See application file for complete search history.

(56) References Cited

U.S. PATENT DOCUMENTS

| 5,610,981 A | 3/1997 | Mooney et al. |
| 6,981,145 B1 | 12/2005 | Calvez et al. |
| 2004/0260782 A1* | 12/2004 | Affleck et al. ............... 709/208 |
| 2005/0055709 A1* | 3/2005 | Thompson ................... 725/30 |

FOREIGN PATENT DOCUMENTS

| DE | 10121819 A1 * | 5/2001 |
| DE | 101 21 819 | 11/2002 |
| EP | 1 028 568 | 2/2000 |

OTHER PUBLICATIONS

Uwe Geiger: "Generationenwechsel bei Bildschirmschreibern," SPS-Magazin, CHNIK-Dokumentations Verlag, Band 2002, Nr. 8, Aug. 2002, XP 002302406, ISSN: 0935-0187.
W. Rankl et al.: "Handbuch der Chipkarten—Aufbau-Funktiosweise-Einsatz von Smart Cards," Munchen, Carl Hanser Verlag, DE 1999, Kapitel 8—Sicherheitstechnik, pp. 450-459, XP002268702, ISBN: 3446211152.
International Preliminary Examination Report with English Translation.
German Office Action dated Jan. 27, 2005 with English Translation.
German Office Action dated May 27, 2004 with English Translation.
International Search Report.

* cited by examiner

*Primary Examiner*—Longbit Chai
(74) *Attorney, Agent, or Firm*—Brinks Hofer Gilson & Lione

(57) ABSTRACT

A method that accesses a data processing system formed from data processing units that are networked, and enables a system technician to access protected data according to the two-person principle is provided.

12 Claims, 2 Drawing Sheets

METHOD FOR ACCESSING A DATA PROCESSING SYSTEM

BACKGROUND

A method for accessing a data processing system is provided.

According to the prior art, data processing systems are composed of a multiplicity of data processing units. It is widely known, for example, that personal computers, computer-controlled equipment, servers and the like are networked to one another to exchange data. Each data processing unit is assigned a restricted number of users. In order to prevent unauthorized use of a data processing unit, each user has a personal password. A user proves his authentication by inputting the password and receives access to the data processing system.

In medical facilities, data processing systems are complex. Diagnostic and analytical devices are components of such medical facilities. These devices must always be kept in a satisfactory functional state. A system technician generally requires access to the data processing system for maintenance and repair of these devices. A continuous problem is that the system technician can under certain circumstances receive access to personal patient data when accessing the data processing system. According to data protection law, a data processing system can only be accessed according to the two man principle, i.e. only by two authorized persons at the same time. In practice, this is virtually impossible to implement. If there is a functional fault in a data processing system, immediate remedy is generally necessary and in some cases two authorized system technicians that are sufficiently qualified to deal with the functional fault are not always available at the same time.

DE 101 21 819 A1 discloses a method in which a doctor is provided with access to patient-specific data only after the doctor reads in a first chip card assigned to him and the patient, whom is present at the same time, and reads in a second chip card that belongs to him, into the data processing device at the doctor's surgery (station), for the purpose of authentication.

SUMMARY

A method for accessing a data processing system that is formed from data processing units which are networked to one another for the exchange of data, is provided. The method includes: providing a first authentication that authenticates a system administrator, authenticating the system administrator on a first data processing unit by transferring the first authentication to an authentication program, providing a second authentication that authenticates a system technician, authenticating the system technician on a second data processing unit by transferring the second authentication to the authentication program and resulting automatic generation of an identification information item that identifies the carrier of the second authentication means, displaying the identification information item on the first data processing unit of the system administrator, and enabling access authorization to the system technician and automatic triggering of a function that generates and stores a log file that logs the activity of the system technician on the data processing system.

The system technician is not provided with access to the data processing system until after a second authentication that is assigned to him has been transferred. The enabling of such access is documented by the generation of an identification information item and is displayed on the first data processing unit of the system administrator. A log file that logs the activity of the system technician by reference, to which the intervention by the system technician can be tracked, is also generated. This ensures that the system administrator always has control over the data. The generated log files make it possible to check whether a system technician has access to data without authorization. In this case, the system administrator can immediately block any further access to the data processing system for the respective system technician. Thus, access to a data processing system is made possible according to the two man principle. It is advantageous that access can only take place if the system administrator has knowledge of the system technician that is active on the data processing unit.

The term "access" is understood to mean any activity during which the data stock (stack) of a data processing system is inspected, changed or copied in its entirety or partially. A "data processing unit" is a device that is connected, for the exchange of data, to other devices that are suitable for the exchange of data. These devices usually have a bidirectional interface and can be a personal computer, computer-controlled systems, computer-controlled devices or the like.

The term "system administrator" is understood to refer to a person who has particular rights with respect to the management and maintenance of the data processing system. In contrast to a system technician, the system administrator is able to permit or block access to the data processing system. This possibility is assigned to the system administrator in particular by the first authentication.

In order to authenticate the system technician, the second authentication can be compared by the authentication program by accessing a file containing a second authentication. When there is correspondence with the second authentication, a corresponding information item is transferred to the system administrator. A "second authentication" is understood to be a copy of the second authentication that has been transferred to the system technician. This copy is managed by the system administrator in a file that only he can access. In order to access the data processing system, the system administrator transfers a second authentication to each system technician. In order to facilitate the checking of the authenticity of the second authentication, these are stored together in the file. If the authentication program detects that an access request is present on the basis of a second authentication which is identical to a verified, second authentication, this is indicated to the system administrator by a suitable information item. Each verified, second authentication contained in the file is assigned an identification information item which is specific thereto. This information item can be, for example, the name and the membership of the system technician of a specific organization. If the second authentication corresponds to a verified, second authentication which is stored in the file, the name and the organization of the system technician can therefore be additionally displayed to the system administrator.

The first, second, or the combination thereof of both the authentications is an authentication code that can be transferred to the authentication program by a keypad provided on a data processing unit. In order to increase security, it is expedient for the authentication code to be stored in a mobile memory unit that can be connected to the data processing system for the transmission of data. The memory unit may be an authentication card that is provided with a data carrier. The authentication card can have a memory for storing the log file, an information item that permits access to the log file, or both. The information item can be, for example, a "link" which can be used to locate and open the log file.

In order to increase the security, the enabling of an access authorization is done via the system administrator by manually triggering a function that is provided for this purpose in the authentication program, and can be accessed exclusively by the system administrator. This ensures that access occurs only with the active consent of the system administrator. However, it may also be the case that access is automatically granted to the system technician after automatic checking of the second authentication. In this case also, a log file is produced automatically. This permits access to data processing systems that have to be kept functionally available without interruption, for example, a medical data processing system.

Provision is made for the connection between the first data processing unit and the second data processing unit to be established via the Internet or via an intranet. This permits access by the system technician from a remote location. It is thus possible for a system technician who has optimum qualifications for the respective problem to access the data processing system at any time, i.e. irrespective of his location. This permits rapid and effective elimination of functional faults. Thus, the authenticity of the accessing system technician is ensured and his activity is logged. The access by the system technician also satisfies the two man principle. A data processing system enables an individual person to process data that normally can be accessed only after authorization or according to the two man principle when the particular authorization is not present. Proof of authorization is expediently given by transferring a third authentication, assigned to the person, to the data processing system. For example, a doctor may be given authorization to access patient data or personal data that requires protection.

DRAWINGS

Exemplary embodiments will be explained in more detail below with reference to the Drawings.

DESCRIPTION

Figure 1:
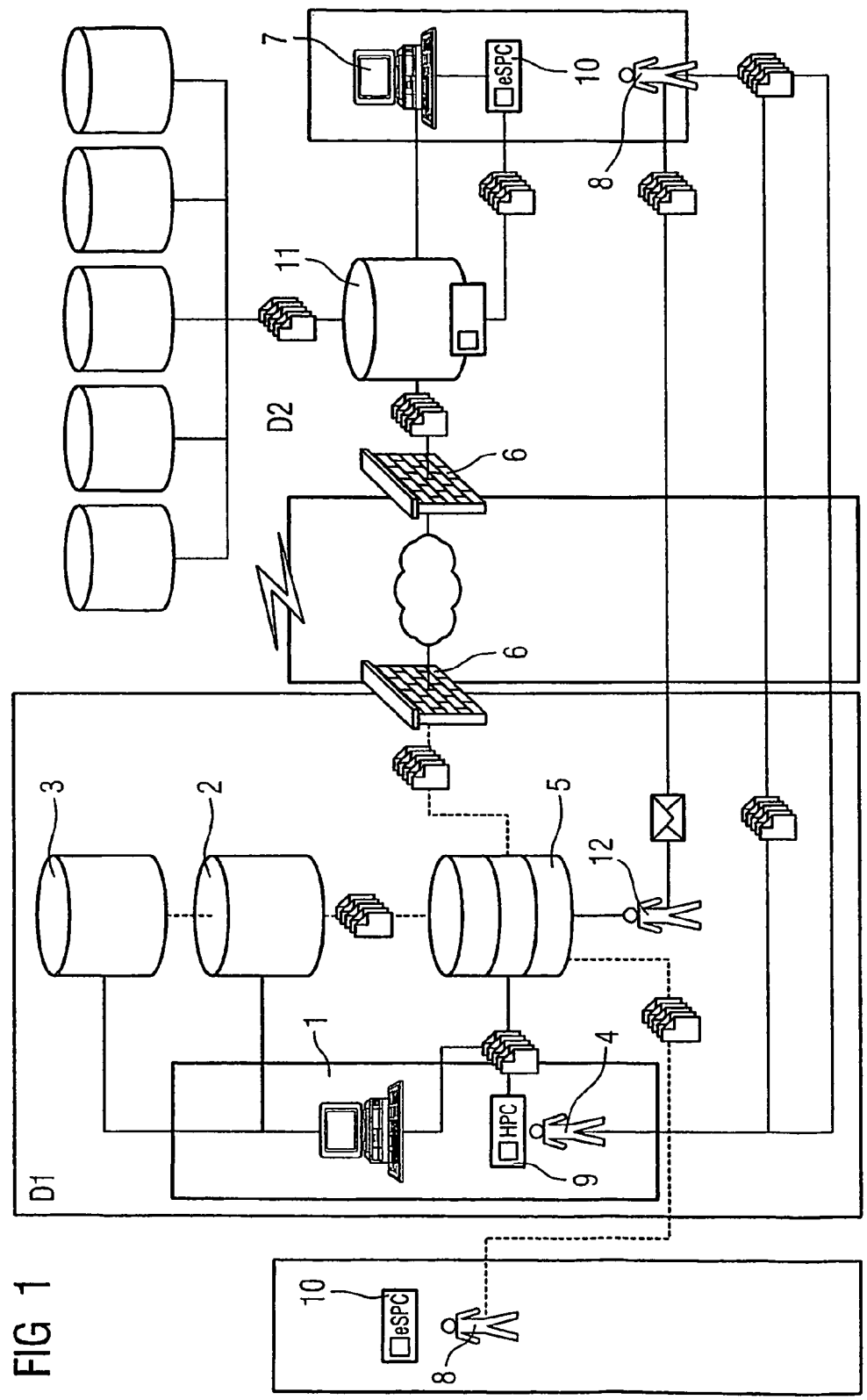
FIG. 1 shows a schematic overview of a method for accessing data.

FIG. 1 is a schematic view of a first data processing unit 1, for example a personal computer. The first data processing unit 1 is a component of a first data processing system D1 that comprises further data processing units. The further data processing units may be, for example, computer-controlled devices 2 or personal computers 3. The first data processing unit 1 is assigned to a system administrator 4 who has authorization over the first data processing unit 1. The system administrator 4 is authorized to assign roles and rights to users of the first data processing system D1 using a first program 5. Such roles and rights permit the respective user only to have access to the data which is necessary for his area of work. The users can access such data at any time, for example, even if the system administrator 4 is not logged into the first data processing system D1.

The first data processing system D1 is logged into a second data processing system D2 of a service organization via a data line which is protected with a firewall 6. The connection can be established, for example, via the Internet or an intranet. The second data processing system D2 comprises a second data processing unit 7, for example, a personal computer that is assigned to a system technician 8.

The first data processing unit 1 has, for its authentication, a first memory card 9 on which a first authentication code is stored. The first authentication code is made available by a suitable reading device of the first data processing system D1.

The second processing unit 7 has, for his authentication, a second memory card 10 on which a second authentication code is stored. The second authentication code can be read out and the first data processing system D1 can access the second authentication code by a suitable reading device. The reading unit for reading out the second memory card 10 does not need to be a component of the first data processing system D1. It can be a component of the second data processing system D2. In this case, the authenticity of the second authentication code can be checked by a second program 11 that is provided in the second data processing system D2, before an attempt is made to access the first data processing system D1.

An example of the function of the device will be described below.

An IT manager 12 who is responsible for the first data processing system D1 and a service organization or the system technician 8 form and agree to a service contract. After the service contract has been finalized, the IT manager 12 sends a second memory card 10 with the second authentication code stored on the second memory card 10 to the system technician 8.

In a first maintenance or repair situation, the system administrator 4 requests a service from the service technician 8 by a telephone call or by e-mail. This may be a service that can be performed from the second data processing unit 7. In this case, the service technician 8 transfers the second memory card 10 to a reading device that is provided at the second data processing unit 7. As a result, the second authentication code that authenticates the service technician 8 within the second data processing system D2 is transferred to the second program 11. The second authentication code is checked. If the second program 11 recognizes the second authentication code as authentic, a connection is established to the first data processing system D1 via the data line. The desired access is checked by the first program 5. It is initially checked whether the first memory card 9 is inserted into a reading device, for example, at the first data processing unit 1. If not inserted into a reading device, access by the system technician 8 is not allowed. If access to the first authentication code that is stored on the first memory card 9 is possible in order to authenticate the system administrator 4, the second authentication code is compared with a multiplicity of second authentication codes that are stored in a file. If the second authentication code is not authentic, the system technician 8 is not allowed access. If the second authentication code is authentic, a log function is triggered. At the same time, the system technician 8 is provided access to the first data processing system D1. As long as the service technician 8 accesses the first data processing system D1, all the changes, supplements and the like to the data stock (stack) of the first data processing system D1 are logged. As soon as the system technician 8 has concluded his activity and has logged off, the log file is closed.

The log file contains the log of all the changes, supplements and the like to the data stock (stack) of the first data processing system D1. The log file also includes the name of the system technician, name of the service organization, login/logout time, and method of access, if appropriate identification of the data processing unit is used for access.

In a second maintenance or repair situation, the system administrator requests a service from the service technician 8. The service requests may comprise, for example, exchanging a module on an X-ray computed tomograph in a hospital. In this case, the service technician 8 logs in on a suitable data processing unit of the first data processing system D1 using the second memory card 10. In this case, access is possible only if the system administrator 4 is logged into the first data processing system D1 at the same time using the first memory card 9.

The system administrator 4 can interrupt the activity of the system technician 8 at any time by interrupting the system technician's 8 access to the first data processing system D1 by interrupting the access to the first authentication code. This may be done, for example, when the system administrator 4 removes the first memory card 9 from the respective reading device. Accordingly, the system administrator 4 always keeps control over the data. Using the automatic logging function makes it is possible to track all the activities of the system technician 8. The system administrator 8 to the first data processing system D1 may block access to the system technician 8 if there is any misuse of the data. To block access, the respective second authentication code that is stored in the file must merely be removed or changed.

With the proposed method, access by the system technician 8 to the data stock (stack) of the first data processing system D1 is possible according to the two man principle, for example, such access always occurs under the control of the system administrator 4. To this extent, unauthorized access by the system technician 8 to personal data which requires protection, for example patient data, can always be prevented.

Figure 2:
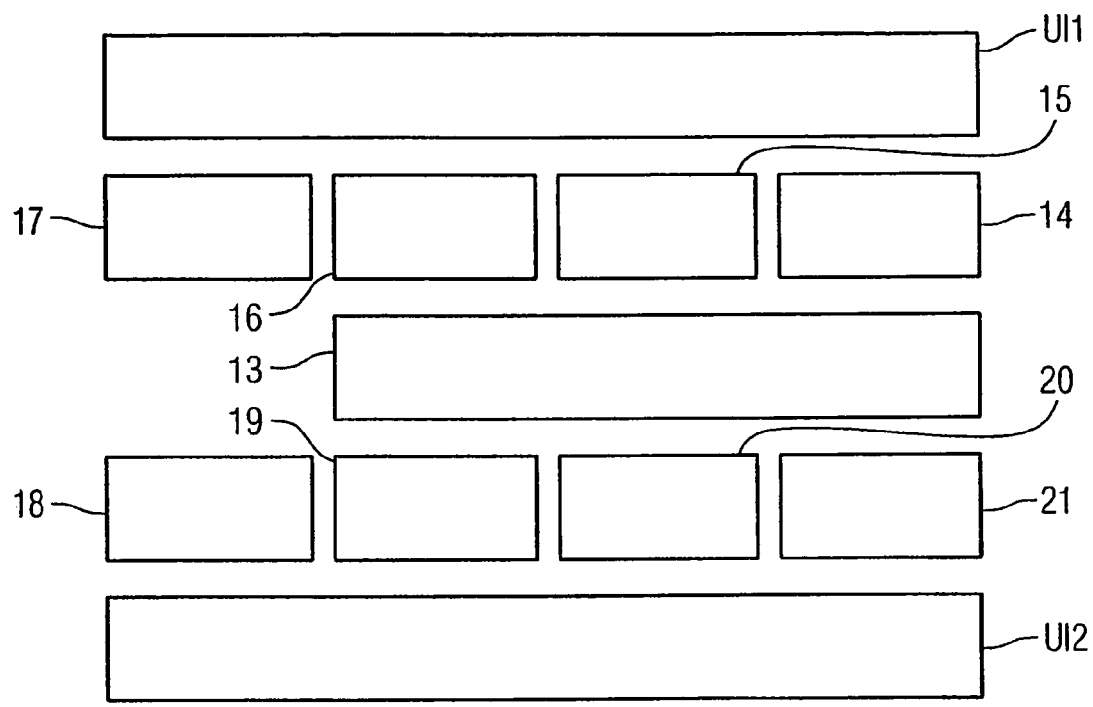
FIG. 2 shows features of an authentication program.

FIG. 2 is a schematic view of the essential components of the first program 5. UI1 is a first user interface for access by the first data processing system D1. UI2 is a second user interface for access, for example, via the data line.

An access module 13 permits or blocks access for a system technician 8 to the first data processing system D1. The access module 13 manages and compares authentication codes.

The first program 5 can have further modules that facilitate maintenance, repair work, or the combination thereof, on the first data processing system D1. It is thus possible, for a localization module 14 to be provided that detects at which data processing unit a qualified system technician 8 is currently active, and at which he can be called if necessary.

The logging module 15 logs the activity of the system technician 8. The logging module 15 creates log files that are produced and stored at a predefined location.

An anonymization module 16 serves to anonymize personal data that requires protection. For example, it is possible to replace names of patients by codes so that, in accordance with the data protection regulations, a system technician 8 is prevented from viewing personal data.

Auxiliary modules 17, 18 give a description of the functions of the first program 5 that are necessary for the system administrator 4 and the system technician 8. A modality module 19 permits data to be exchanged, for example, with computer-controlled devices such as X-ray computed tomographs. An IT system module 20 permits data to be exchanged with databases. An operating system module 21 provides the necessary conditions for correct integration of the first program 5 into the respective operating system.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

The invention claimed is:

1. A method for accessing a data processing system that is formed from data processing units that are networked to one another comprises:
   configuring a processor to perform:
   providing a first authentication that authenticates a system administrator,
   authenticating the system administrator on a first data processing unit by transferring the first authentication to an authentication program,
   providing a second authentication that authenticates a system technician:
   authenticating the system technician on a second data processing unit by transferring the second authentication to the authentication program and generating an identification information item that identifies the carrier of the second authentication, the first data processing unit being remote from the second data processing unit,
   displaying the identification information item on the first data processing unit of the system administrator,
   enabling access authorization to the system technician when the first authentication is authenticated at the first data processing unit and the second authentication is authenticated at the second data processing unit, and
   checking whether the first authentication and second authentication are authenticated at a same time prior to enabling the access authorization,
   automatic triggering a function that generates and stores a log file that logs the activity of the system technician on the first data processing system.

2. The method as claimed in claim 1, wherein the second authentication is compared in the authentication program to a file that contains the second authentication, and when there is correspondence with the second authentication a corresponding information item is transferred to the system administrator.

3. The method as claimed in claim 2, wherein the second authentication contained in the file is assigned an identification information item that is specific thereto.

4. The method as claimed in claim 3, wherein the identification information item comprises a name of the system technician.

5. The method as claimed in claim 3, wherein the identification information item comprises the membership of the system technician of a specific organization.

6. The method as claimed in claim 1, wherein the connection between the first data processing unit and the second data processing unit is established via the Internet or via an Intranet.

7. A method for accessing a data processing system that is formed from data processing units that are networked to one another comprises:
   configuring a processor to perform:
   providing a first authentication that authenticates a system administrator,
   authenticating the system administrator on a first data processing unit by transferring the first authentication to an authentication program,
   providing a second authentication that authenticates a system technician,
   authenticating the system technician on a second data processing unit by transferring the second authentication to the authentication program and generating an identification information item that identifies the carrier of the second authentication, the first data processing unit being remote from the second data processing unit,
   displaying the identification information item on the first data processing unit of the system administrator,
   enabling access authorization to the system technician when the first authentication and second authentication are authenticated at a same time and triggering of a function that generates and stores a log file that logs an activity of the system technician on the second data processing system, and checking whether the first authentication and second authentication are authenticated at the same time prior to enabling access authorization, wherein the enabling access authorization is done via the system administrator by manually triggering a function that is provided for this purpose in the authentication program, and can be accessed exclusively by the system administrator.

8. The method as claimed in claim 7, wherein the data processing system processes data that can be accessed by individuals with a simple authorization according to a two man principle when the particular authorization is not present.

9. The method as claimed in claim 8, wherein proof of the particular authorization is given by transferring a third authentication to the data processing system.

10. The method as claimed in claim 9, wherein the third authentication is assigned to the person.

11. The method as claimed in claim 8, wherein the data is personal data that requires protection.

12. The method according to claim 8, wherein the personal data is patient data.

* * * * *

UNITED STATES PATENT AND TRADEMARK OFFICE
CERTIFICATE OF CORRECTION

| | | |
|---|---|---|
| PATENT NO. | : 7,624,430 B2 | Page 1 of 1 |
| APPLICATION NO. | : 10/579685 | |
| DATED | : November 24, 2009 | |
| INVENTOR(S) | : Gilek et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 471 days.

Signed and Sealed this
Fourth Day of January, 2011

David J. Kappos
*Director of the United States Patent and Trademark Office*